United States Patent [19]

Riede

[11] 4,080,295

[45] Mar. 21, 1978

[54] ARRANGEMENT FOR THE DIFFUSION OF SUBSTANCES BETWEEN TWO FLUIDS VIA SEMIPERMEABLE MEMBRANES

[75] Inventor: Gerhard Riede, Vellinge, Sweden

[73] Assignee: Gambro AG, Zug, Switzerland

[21] Appl. No.: 762,020

[22] Filed: Jan. 24, 1977

[30] Foreign Application Priority Data

Feb. 16, 1976 Sweden .................................. 7601673

[51] Int. Cl.² ............................................. B01D 31/00
[52] U.S. Cl. .................................................. 210/321 B
[58] Field of Search ....................... 210/321 B, 321 A; 55/158; 23/258.5 R; 159/DIG. 27, DIG. 28

[56] References Cited

U.S. PATENT DOCUMENTS

| | | | |
|---|---|---|---|
| 3,034,505 | 5/1962 | Sobol | 210/321 B |
| 3,362,540 | 1/1968 | Bluemle | 210/321 B |
| 4,016,082 | 4/1977 | Riede et al. | 210/321 B |

Primary Examiner—Frank A. Spear, Jr.
Assistant Examiner—E. Rollins Cross
Attorney, Agent, or Firm—Lerner, David, Littenberg & Samuel

[57] ABSTRACT

An arrangement is disclosed for the diffusion of substances between two fluids via semipermeable membranes. The membranes are arranged in a stack of at least two pairs of such membranes, a first fluid being conducted between the membranes in these pairs, while another fluid is conducted outside the same membranes, the membranes in the pairs being interconnected so that they form a grating of channels between themselves for the first fluid by being joined to one another at a plurality of points.

9 Claims, 5 Drawing Figures

ARRANGEMENT FOR THE DIFFUSION OF SUBSTANCES BETWEEN TWO FLUIDS VIA SEMIPERMEABLE MEMBRANES

BACKGROUND OF THE INVENTION

This invention relates to the diffusion of substances between two fluids via semi-permeable membranes and, more particularly, to an improved arrangement for interconnection of the membranes.

In such an arrangement, the membranes are arranged in a stack of at least two pairs of membranes, with a first fluid being conducted between the membranes in these pairs and a second fluid being conducted outside the same membranes. In prior art arrangements for the diffusion of substances between two fluids via semipermeable membranes, providing channels between membranes arranged in pairs was brought about by clamping the membranes together at points or along certain lines within carefully defined areas. Most frequently relatively complicated spacing plates were used with a plurality of projections and channels arranged between them. Examples of such constructions are described for example in U.S. Pat. Nos. 3,411,630 and 3,516,548.

In a later construction which forms the subject of the U.S. Pat. No. 4,016,082, a similar grating of channels is produced instead by glueing, hot-sealing, etc. within a pattern of points, lines and/or small areas. This made it possible to simplify the spacing plates and to design them as simple frames, which required less precision in manufacture than the aforementioned complicated spacing plates.

SUMMARY OF THE INVENTION

It is the object of the present invention to produce a further simplification as a result of which the need for spacing plates and/or frames can be eliminated. This is achieved by an arrangement which is characterized in that adjacent membranes from different membrane pairs lying next to one another are joined together along their peripheries for the purpose of forming between themselves a closed space for the second fluid, this closed space being connected to an inlet and outlet for this fluid. The inlet and outlet for the second fluid each comprises suitable holes in adjacent membranes, the holes being in stacked relationship relative to each other along an axis substantially perpendicular to the membranes. The membranes in each membrane pair are also joined to one another along a closed connection around the periphery of these holes. This ensures that the second fluid cannot penetrate in between membranes in the respective membrane pair and be mixed with the first fluid present there.

For the first fluid the inlet and outlet can be arranged in the form of holes in adjacent membranes, the holes being in stacked relationship relative to each other along an axis substantially perpendicular to the membranes. The adjacent membranes of the separate membrane pairs lying next to one another are joined to one another also along a closed connection around the periphery of these holes. In this manner the first fluid is prevented from penetrating out into the closed spaces outside the respective membrane pair which is intended for the second fluid.

The closed connections around the respective holes are produced appropriately by glueing or hot-sealing, but they can of course also be produced in a different manner, e.g. by some kind of clamping arrangements.

In a preferred arrangement a number of membranes are joined to one another in the form of a bellows-like construction. The uppermost and the lowermost membrane in this bellows-like construction can then be fixed in an outer enclosure so that the construction can be maintained spread out even if anyone of the said fluids is subjected to a vacuum.

The space between the bellows-like construction and the outer enclosure may also be filled by a packing which further facilitates the maintaining of the construction in spread out condition whilst it can at the same time seal up possible leakages.

For the feed and discharge of the different fluids the outer enclosure may be provided with connecting nozzles for the inlet and outlet respectively of these fluids. The outermost membranes in the bellows-like construction are appropriately arranged so that they can be connected to the enclosure to form a seal along a closed line around the periphery of the mouth facing inwards of the nozzle concerned. These outer membranes may be connected over the whole of their surface to a top or bottom plate of this outer enclosure.

In practice it has been found appropriate in two adjacent membrane pairs to join the membranes belonging to the respective membrane pairs to one another along an outer contour which is situated completely inside the outer contour along which adjacent membranes from different membrane pairs are joined to each other.

The invention is principally intended to be used in connection with the dialysis of blood. The first fluid in such a case consists of blood whilst the other fluid consists of a salt solution with the help of which toxic and other undesirable substances are removed from the blood. To those versed in the art it will be clear, however, that the construction can also be used for other purposes, e.g. the oxygenation of blood when the first fluid consists of blood whilst the other fluid consists of air or oxygen. The term fluid is intended to cover liquids as well as gases.

In the following a preferred embodiment of the arrangement in accordance with the invention is shown as an example with reference to the enclosed drawings. This embodiment is intended for the purification of blood, that is to say for blood dialysis, and is described therefore in connection with such an application, but the invention is only intended to be limited by the scope of the appended claims.

DESCRIPTION OF THE PREFERRED EMBODIMENT

Figure 1:
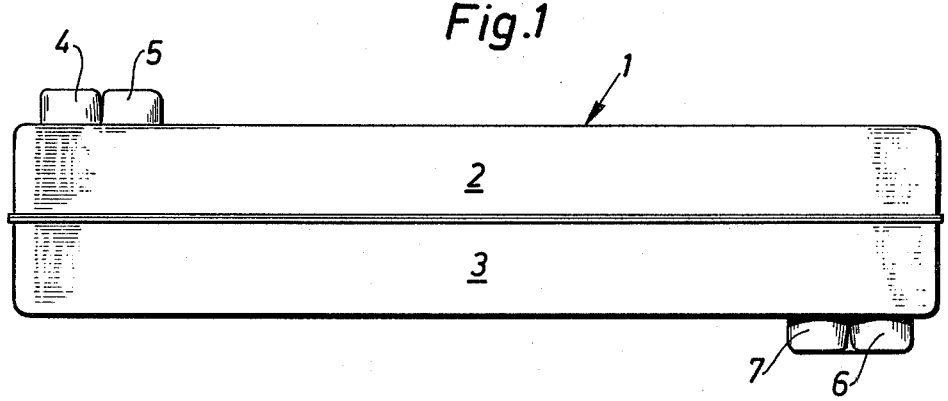
FIG. 1 shows the outer enclosure of the arrangement seen from the side.
Figure 2:
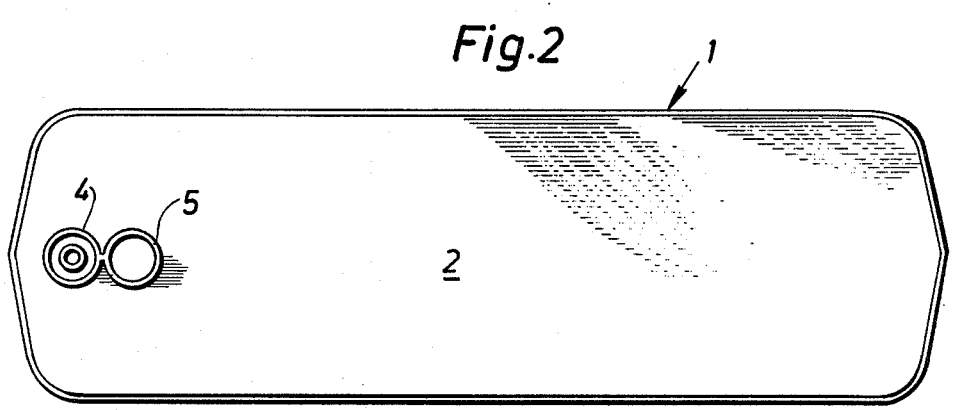
FIG. 2 shows the same outer enclosure seen from the top.

The dialysis arrangement shown as an example consists of an outer enclosure which as a whole is designated 1 and which comprises an upper part 2 and a lower part 3. The upper part 2 is provided with an inlet nozzle 4 for the blood and an outlet nozzle 5 for the purifying liquid. In the same manner the lower part 3 is provided with an outlet nozzle 6 for the blood and an inlet nozzle 7 for the purifying liquid.

Figure 3:
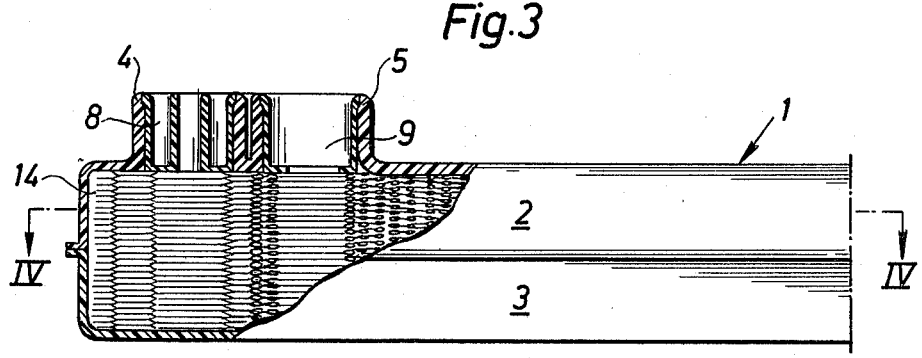
FIG. 3 shows one end of the arrangement partially in section, the section being taken along the line III—III in FIG. 4.
Figure 4:
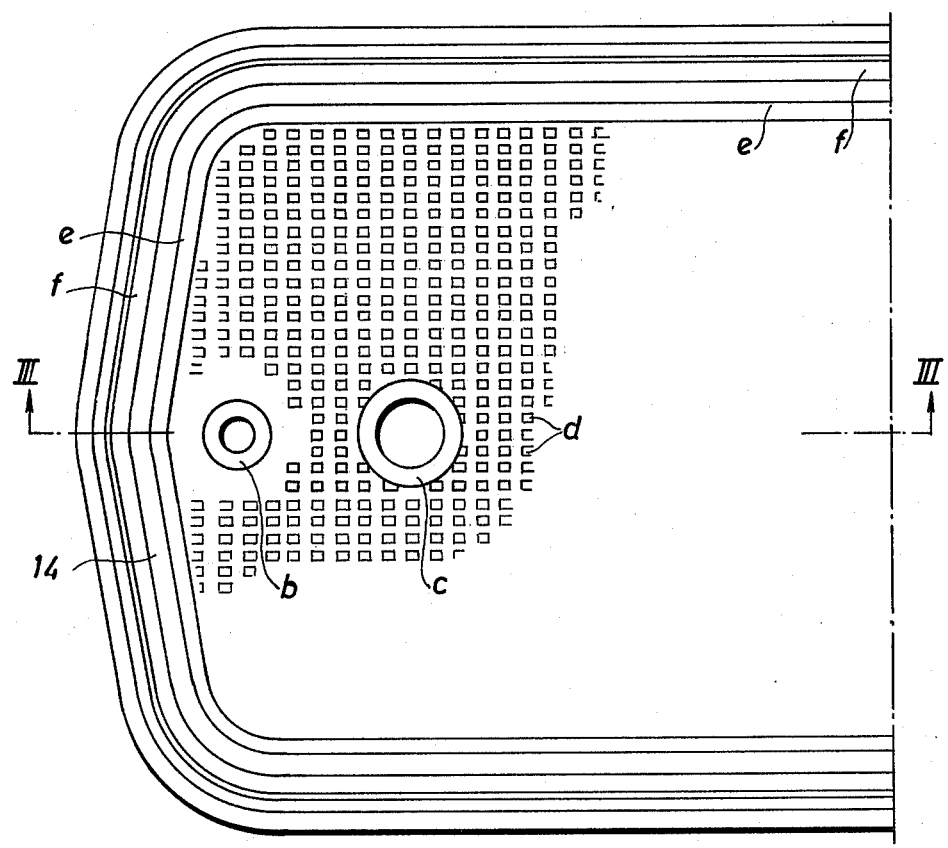
FIG. 4 shows in the same manner a section along line IV—IV in FIG. 3.
Figure 5:
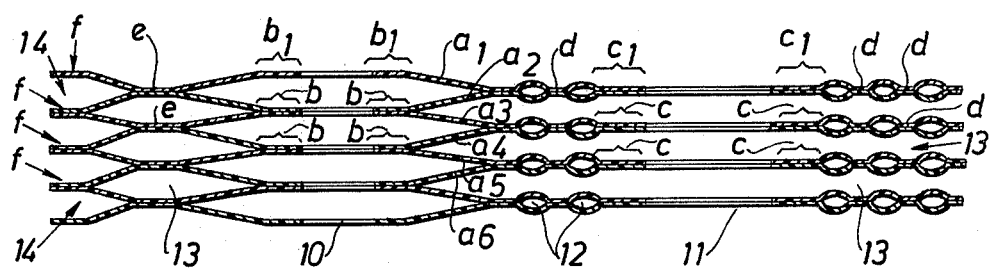
FIG. 5 shows on a larger scale a detail from the section in FIG. 3.

The construction of these nozzles can best be seen in FIG. 3 which shows that the nozzles are provided with inserts 8 and 9 respectively which are meant on the one hand to facilitate the connecting up of flexible tubes for blood and purifying fluid respectively and on the other hand are connected to the outer membrane in a bellows-like construction of membranes arranged in pairs. This construction is shown on a larger scale in FIG. 5 where the outermost membrane is designated $a_1$ and the following $a_2, a_3, a_4, a_5$, etc. The outermost membrane $a_1$ is intended to be fixed to the insert 8 within an annular area marked $b_1$. In the same manner the insert 9 is intended to be fixed within an annular area marked $c_1$. The membrane $a_1$ and $a_2$ are joined to one another in a point pattern which will be appreciated best by a comparison between FIGS. 4 and 5. The points are designated by the letter $d$. Furthermore, the membranes within each such membrane pair $a_1, a_2, a_3, a_4, a_5, a_6$, etc. are joined to one another along a closed line designated $e$ and marked in FIG. 4 as well as in FIG. 5. Adjacent membranes in membrane pairs lying next to one another, e.g. membranes $a_2 a_3$ or membranes $a_4 a_5$ are joined to each other instead along annular zones $b$ corresponding to the zone $b_1$ where the outer membrane $a_1$ is fixed to the insert 8. Furthermore, the lastmentioned membranes are joined to one other along a closed line around the periphery, this line being designated $f$ in FIGS. 4 and 5. By the abovementioned design an inlet 10 for the blood and 11 for the purifying liquid is formed. The blood is then discharged through the channels 12 between the membranes arranged in pairs whilst the purifying liquid is discharged into the closed space 13 between the different membrane pairs. By the attachment of the outermost membrane $a_1$ and the corresponding membrane in the bottom of the membrane packet to the top and bottom respectively of the enclosure 1, the bellows-like design is maintained in spread out condition and prevented from collapsing even if anyone of the liquids is subjected to a vaccum. This spreading out can be further assisted if the spaces 14 between the enclosure 1 and the membranes are filled up with the help of a suitable packing. This packing may be utilized in such a case to achieve extra sealing of the total construction. The letter $c$ finally designates annular zones along which membranes in the respective membrane pairs are joined together to form the closed channels 11 for purifying liquid.

Naturally the invention is not limited exclusively to the embodiment of the subject of the invention described above, but may be varied within the scope of the following claims. For example, the point pattern shown may be substituted by a wide range of other patterns, some of which are shown as examples in the aforementioned U.S. Pat. No. 4,016,082.

The term point pattern includes different types of line patterns, e.g. of the type as shown in the said patent application. This is justifiable since a line can also be regarded as being composed of a number of points.

I claim:

1. An arrangement for the diffusion of substances between a first fluid and a second fluid, including a plurality of semi-permeable membranes arranged in a stack of at least two pairs of said membranes, said arrangement being adapted to conduct the first fluid between the membranes in the pairs and conduct the second fluid outside the same membranes and between the membrane pairs, the membranes in respective pairs being interconnected at a plurality of points so as to form a grating of channels between themselves for said first fluid and adjacent membranes from different membrane pairs being joined together along a first outer contour at their peripheries so as to form a closed space for said second fluid between adjacent membranes from the different membrane pairs, an inlet and an outlet for said first fluid connected to said channels and an inlet and an outlet for said second fluid connected to said closed space.

2. The arrangement according to claim 1 wherein said plurality of membranes are formed with first and second sets of holes in respective stacked relationship relative to each other along a respective axis transverse to the membranes, the membranes in each membrane pair being joined to one another along a closed connection around the periphery of said holes in respective sets, said first set of holes in stacked relationship being connected to form said inlet for said second fluid and said second set of holes in stacked relationship being connected to form said outlet for said second fluid.

3. The arrangement according to claim 1 wherein said plurality of membranes are formed with first and second sets of holes in respective stacked relationship relative to each other along a respective axis transverse to the membranes, the adjacent membranes from different membrane pairs lying next to one another being joined to one another along a closed connection around the periphery of said holes in respective sets, said first set of holes in stacked relationship being connected to form said inlet for said first fluid and said second set of holes in stacked relationship being connected to form said outlet for said first fluid.

4. The arrangement according to claim 1 wherein said membrane pairs are interconnected to form a bellows-like construction.

5. The arrangement according to claim 4 further comprising an outer enclosure member for said membranes and wherein the outermost membranes in the bellows-like construction are connected to said outer enclosure, whereby said membranes are maintained spread out and prevented from collapse.

6. The arrangement according to claim 5 wherein said outer enclosure member includes a plurality of connecting nozzles, each respectively associated with an inlet or outlet for said first or second fluid, each of said nozzles including a mouth portion extending through said outer enclosure member, and wherein the outermost membrane in the bellows-like construction is connected to said outer enclosure so as to form a plurality of seals each along a closed line around the periphery of a respective one of said plurality of nozzle mouths.

7. The arrangement according to claim 5 further including packing material between said outer enclosure member and the edges of said bellows-like construction.

8. The arrangement according to claim 1 wherein the membranes in respective membrane pairs are joined to one another along a second outer contour which lies within said first outer contour along which adjacent membranes from different membrane pairs are joined to each other.

9. The arrangement according to claim 1 wherein said plurality of membranes are formed with first and second sets of holes in respective stacked relationship relative to each other along a respective axis transverse to the membranes, the membranes in each membrane pair being joined to one another along a closed connection around the periphery of said holes in respective sets, said first set of holes in stacked relationship being connected to form said inlet for said second fluid and said second set of holes in stacked relationship being connected to form said outlet for said second fluid, said plurality of membranes are further formed with third and fourth sets of holes in respective stacked relationship relative to each other along a respective axis transverse to the membranes, the adjacent membranes from different membrane pairs lying next to one another being joined to one another along a closed connection around the periphery of said holes in respective sets, said third set of holes in stacked relationship being connected to form said inlet for said first fluid and said fourth set of holes in stacked relationship being connected to form said outlet for said first fluid, said arrangement further comprising an outer enclosure member for said membranes, said outer enclosure member including a plurality of connecting nozzles, each nozzle respectively associated with an inlet or outlet for said first or second fluid, each of said nozzles including a mouth portion extending through said outer enclosure member, and wherein the outermost membrane in the stack of membranes is connected to said outer enclosure so as to form a plurality of seals between said plurality of nozzle mouths and the periphery of a respective one of said sets of holes.

* * * * *